United States Patent [19]

Gansloser

[11] 3,712,470

[45] Jan. 23, 1973

[54] APPARATUS AND METHOD FOR REMOVING FOREIGN MATTER FROM A POOL OF LIQUID

[76] Inventor: Emil Gansloser, Grazer Strasse 26, 3 Hannover, Germany

[22] Filed: Oct. 23, 1970

[21] Appl. No.: 83,413

[30] Foreign Application Priority Data

Oct. 29, 1969 Germany....................P 19 54 461.7

[52] U.S. Cl.....................................210/61, 210/169

[51] Int. Cl...............................................C02b 1/18

[58] Field of Search...................134/10; 210/169, 61

[56] References Cited

UNITED STATES PATENTS

| | | | |
|---|---|---|---|
| 1,670,094 | 5/1928 | Becker | 210/169 |
| 1,563,851 | 12/1925 | Hartman | 210/169 X |
| 1,762,366 | 6/1930 | Test | 210/169 |
| 3,506,489 | 4/1970 | Baker | 210/169 X |

*Primary Examiner*—Samih N. Zaharna
*Assistant Examiner*—T. A. Granger
*Attorney*—George F. Dvorak, Stephen T. Skrydlak and Marden S. Gordon

[57] ABSTRACT

An apparatus and method for removing foreign matter from a pool of liquid wherein a plurality of spaced nozzles are disposed in the opposite sidewalls of the pool for injecting streams of conically-shaped inoculum carrying liquid into the pool, the nozzles being arranged in the opposite sidewalls so that the outer surfaces of the streams from opposite nozzles intersect and slightly overlap such that the turbulence mixing regions of all the streams occupy approximately all of the liquid in the pool, with drain openings being located in the pool in those regions of least turbulence to remove the foreign matter from the pool.

7 Claim, 7 Drawing Figures

APPARATUS AND METHOD FOR REMOVING FOREIGN MATTER FROM A POOL OF LIQUID

BACKGROUND OF THE INVENTION

In order to inoculate the large amount of liquid present in swimming pools, biological clarification basins, and the like, for the purposes of sterilization or cleaning, it is known to use a portion of the liquid contained in the pool as a carrier of the inoculum in a steady type of circulation thereby introducing the inoculum into the liquid in the pool. In view of the great amount of water involved, difficulties are encountered in achieving a rapid and complete dispursion of the inoculant into substantially all of the liquid.

In the past, the introduction of the liquid carrying inoculant has occurred from a tube which protrudes into the center of the main body of liquid in the pool. The inoculation liquid then more-or-less randomly diffuses through the liquid in the pool. With a large amount of liquid, this process of random diffusion is quite time consuming and does not assure that all of the liquid in the pool has been treated.

SUMMARY OF THE INVENTION

The apparatus and method of the present invention provides for the rapid and uniform distribution of the inoculum throughout approximately all of the liquid present in the pool in that the liquid carrying inoculum is injected into the liquid of the pool by means of nozzles placed along two opposite sides of the pool. From these nozzles are emitted turbulent conically-shaped streams of inoculant carrying liquid, the axes of the nozzles being generally parallel to each other such that the streams emitted from the nozzles on opposite sides of the pool intersect and slightly overlap each other approximately in the region of the longitudinal center plane of the pool in order to assure that the turbulence-mixing regions of the liquid streams occupy substantially all of the liquid in the pool.

It was found that by turbulently injecting the inoculant into the pool, problems were encountered as to removing the foreign matter from the pool due to the turbulent condition of the liquid in the pool. This problem of foreign matter is solved in the present invention in that research and experimentation showed where the least points of turbulence exist in a pool relative to the location of the nozzles, and since these points of least turbulence gather the greatest proportion of deposited foreign matter, it is at these locations that drain openings are disposed in the pool such that effective removal of foreign matter is achieved in spite of the great amount of turbulence existing in the other regions of the body of liquid in the pool.

Experimentation and research has determined that it is advantageous to remove the foreign matter at several spots distributed evenly across the bottom of the pool in the regions of least turbulence, one such region being found to be under the apex portion of the conically-shaped liquid stream as it is emitted from the nozzle. Another region being along the longitudinal axis of the pool as this is the zone of intersection of the streams emitted from the opposed nozzles. Still a further region has been determined to be in the pool bottom along the sidewall of the pool in positions approximately opposite to the nozzles from which the stream is being emitted. A combination of the various locations of drain openings has proven to be extremely effective in removing substantially all of the foreign matter which is settled out from the liquid in the pool.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENTS

Figure 1:
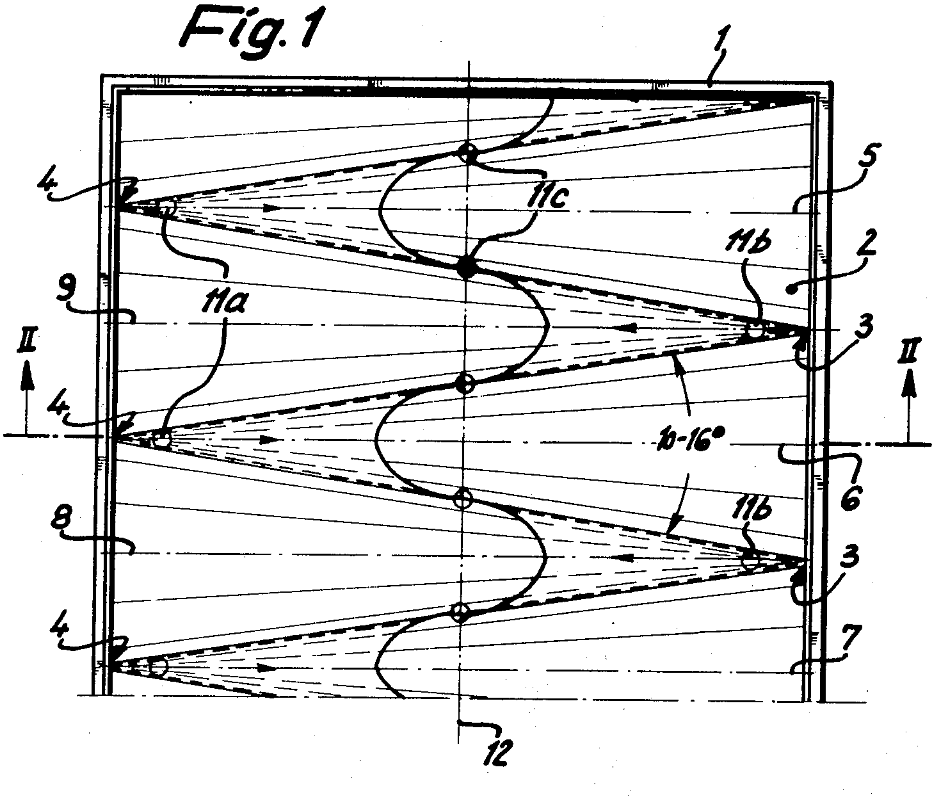
FIG. 1 is a fragmentary top plan view of a pool of liquid illustrating nozzles and drain locations disposed according to the present invention.
Figure 2:
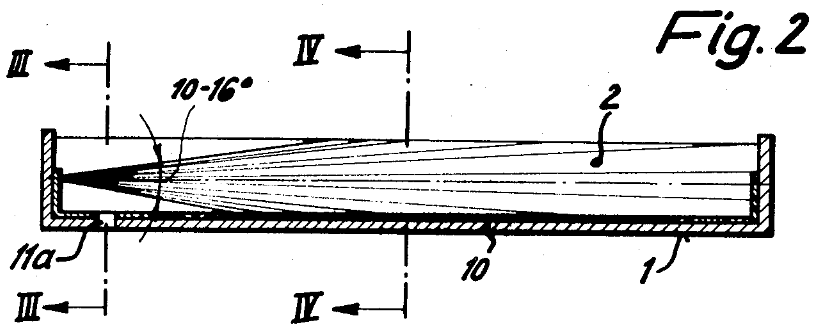
FIG. 2 is an end elevational section view taken on line II—II of FIG. 1.
Figure 3:
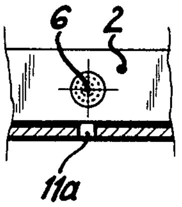
FIG. 3 is a fragmentary side elevational section view taken on line III—III of FIG. 2.
Figure 4:
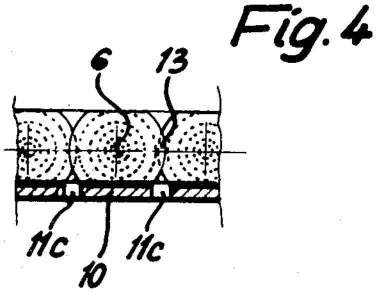
FIG. 4 is a fragmentary side elevational section view taken on line IV—IV of FIG. 2.

In the drawings, wherein for the purpose of illustration is shown preferred embodiments of the invention, and referring to FIGS. 1 through 4 inclusive, there is indicated generally a basin or pool 1 containing a body of liquid 2. A series of nozzles 3 and 4 are disposed along opposite sides of the pool 1 for continuously injecting portions of liquid 2 carrying an inoculum into the pool 1 thereby continuously keeping the liquid 2 in circulation and using the liquid as the carrier for the inoculum. The inoculum carrying liquid is injected from the nozzles 3 and 4 into the liquid 2 as a conically-shaped liquid jet stream which turbulently flows from the nozzle to the opposite side of the pool 1. It has been found to be exceedingly advantageous to the turbulent effect if the cone-angle at the apex of the conically-shaped stream is from about 10° to about 16°.

The axes 5, 6, and 7 of the nozzles 4 along the the axes 8 and 9 of the nozzles 3 lie in parallel relationship to each other with the nozzles being disposed along the sidewalls of the pool such that axis 8 lies approximately intermediate axes 6 and 7, axis 6 lies approximately intermediate axes 8 and 9, axis 9 lies approximately intermediate axes 5 and 6. The axes 5, 6, and 7 may lie in the same horizontal plane relative to the pool bottom as the axes 8 and 9, but, if so desired, the axes 5, 6, and 7 may lie at a different height and in a different plane than the axes 8 and 9. However, the nozzles 3 and 4 and their respective axes would always be arranged with respect to each other so that the turbulence!-mixing regions of all the liquid streams will move through approximately all of the liquid 2 in the pool 1 so that the liquid in the pool will be inoculated in a very short time.

In order to guarantee an intensive mixing of the inoculant throughout the entire pool 1, it is preferred that the mixing regions of adjacent nozzles 3 and 4 intersect each other and slightly overlap. This is preferably achieved by making the axial distances between the nozzles smaller than about 75% of the value at which the conically-shaped stream would in theory make contact with each other so that the streams emitted from the opposite adjacent nozzles intersect generally along the longitudinal axis of the pool.

In liquid containing basins such as swimming pools, biological settling tanks, and the like, it is preferrable to continuously remove the foreign matter which settles out from the liquid in the pool, such removal being performed even during the inoculation of the liquid. In order to accomplish this removal of foreign matter, drain locations 11*a*, 11*b*, and 11*c* are provided at the bottom of the pool 1 and are approximately evenly distributed across the pool bottom.

The drain openings 11a and 11b lie close to the sidewalls of the pool 1 and are positioned approximately beneath the nozzle injecting the inoculant such that the openings are beneath the apex of the conically-shaped stream of liquid as it is injected into the pool 1. The drain openings 11c are located along the longitudinal axis 12 of the pool bottom, this being beneath the approximate zone of contact 13 between adjacent liquid streams.

Certain pools or basins may also have drain locations along the bottom of the pool adjacent the sidewalls and located generally opposite to the nozzle on the opposite sidewall from which the inoculant is being injected.

The regions set forth above for removal of foreign matter have been determined by experimentation to be those regions of smallest turbulence and accordingly it is in such regions that the bulk of the foreign matter becomes deposited, so that in spite of the turbulence existing in the other regions of the liquid 2 in the pool 1, a good removal of the foreign matter is accomplished.

Figure 5:
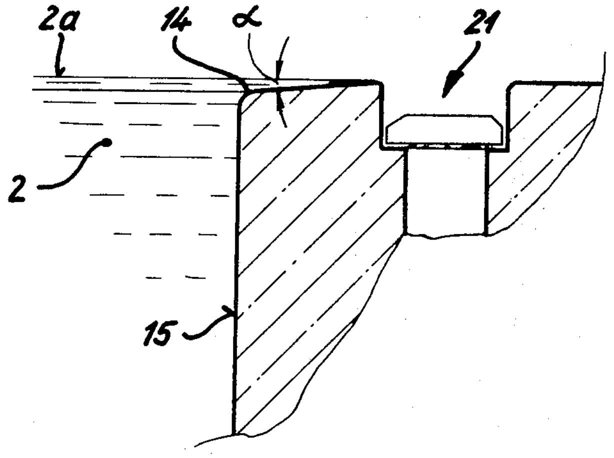
FIG. 5 is a fragmentary sectional elevational view of a top wall of a pool illustrating a further embodiment of the present invention.

Referring now to FIG. 5, this illustrates the removal of foreign matter from the top surface 2*a* of the liquid 2 for uses where the pool is of a shape requiring such removal by the circulating of the liquid over the top ledge 14 of the sidewall or endwall 15 of a pool. In such pool constructions, the level 2*a* of the liquid 2 is maintained slightly higher than the ledge 14 which tapers upwardly in an outward direction from the liquid and towards the removal trough 21, this angle of taper being indicated by the reference $\alpha$. This type of foreign matter removal from the top level 2*a* of the liquid 2 which circulates across the ledge 14 and into the trough 21 provides the additional advantage that the impurities which are floating atop the liquid are removed, along with providing the additional benefit of a pleasant visional impression being created in that a rather smooth liquid level is achieved. This smooth level is achieved and maintained since waves which may be created on the liquid 2 will flow over the wall 15 and into the trough 21 without encountering any resistance and thus avoiding bounceback or wave reflection in the pool, whereas waves created in pools not filed to the top of the surrounding walls would then strike the wall and reflect back into the pool.

In the swimming pool construction as just described, preferably about two-thirds of the circulating liquid and foreign matter therein is removed at the bottom of the pool, with approximately one-third being removed by flowing across the ledge 14 and into the trough 21. Generally speaking, it is preferable to remove the major portion of the circulating liquid 2 through the drain openings in the bottom of the pool, and only remove through the trough 21 that amount of liquid necessary to assure a steady and constant flow of the liquid 2 continuously around the pool ledge 14.

Figure 6:
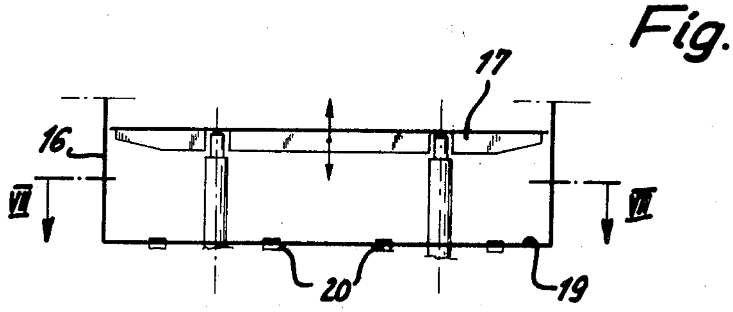
FIG. 6 is a schematic side elevational view of a pool illustrating a false bottom which is vertically adjustable relative to the bottom of a pool.
Figure 7:
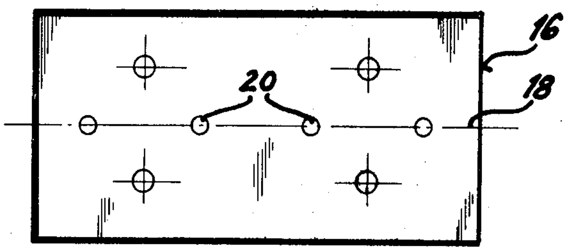
FIG. 7 is a schematic top plan section view taken along line VII—VII of FIG. 6.

Referring to FIGS. 6 and 7, there is shown a swimming pool 16 which is provided with an adjustably supported false bottom 17 which can be vertically raised or lowered with respect to the bottom 19 of the pool. Drain openings 20 have been provided along the longitudinal axis 18 of the pool 16, these openings being distributed uniformly across the bottom of the swimming pool. The edge regions of the bottom 19 of the pool 16 are kept clean by the liquid 2 which passes between the side portions of the pool and the edges of the false bottom 17.

It is to be understood that the form of this invention herewith shown and described is to be taken as a preferred example of the same, and that various changes in the shape, size, and arrangement of parts may be resorted to without departing from the spirit of the invention or the scope of the subjoined claims.

I claim:

1. Apparatus for removing foreign matter from a body of liquid in a pool, the pool including a pair of endwalls, a pair of sidewalls, and a bottom comprising:

a plurality of nozzle means in the sidewalls for injecting conically-shaped streams of inoculum carrying liquid into the pool, a first nozzle in a first sidewall constructed and arranged whereby a side of its conically shaped discharge stream is parallel to a side of the conically-shaped discharge system of a second nozzle oppositely disposed in a second sidewall, a third nozzle in said first sidewall constructed and arranged whereby a side of its conically-shaped discharge stream is parallel to a side of the conically shaped discharge stream of said second nozzle, and successive nozzles arranged similarly whereby the entire upper portion of said body liquid in said pool is substantially comprised of said oppositely disposed conically shaped discharge streams; and drain means for said pool located in the bottom of said pool vertically beneath each of said nozzles located in the sidewalls of said pool.

2. Apparatus as described in claim 1 wherein the drain means comprises a plurality of spaced openings disposed in the bottom of the pool, vertically beneath the overlapping region of oppositely directed discharge streams in said body of water in said pool.

3. Apparatus as described in claim 1 wherein the drain means comprises a continuous gutter type groove extending along the sidewalls at the approximate liquid level surface of the body of liquid in said pool for removing foreign matter from the surface of the liquid.

4. Apparatus as described in claim 1 wherein the nozzles are disposed in a horizontal plane which is parallel to the surface of the body of liquid in said pool.

5. Apparatus as described in claim 1 wherein each of said nozzles have an outlet opening adapted for emitting said conically-shaped discharge stream therefrom in the shape of a cone having a fluid spread cone angle at the apex of the discharge stream of about 10° to 16°.

6. The method of removing foreign matter from a body of liquid in a pool, the pool including a pair of endwalls, a pair of sidewalls, and a bottom comprising the steps of:

injecting conically shaped streams of inoculum carrying liquid into the pool from a plurality of nozzles disposed in the pool, injecting a first conically shaped discharge stream from a first sidewall whereby a side of the discharge stream is parallel to a side of a second conically shaped discharge stream emitted from an oppositely disposed second sidewall, injecting a third conically shaped discharge stream from said first sidewall whereby a side of its discharge stream is parallel to a side of said second discharge stream, and injecting successive conically shaped discharge streams similarly into said pool whereby the entire upper portion of said body of liquid is said pool is substantially comprised of said oppositely disposed conically shaped discharge streams; and withdrawing foreign matter from the body of liquid in said pool at drain openings disposed in the pool vertically beneath each of said nozzles located in the sidewalls of said pool.

7. The method of claim 6 further comprising the step of maintaining the discharge stream from each nozzle in a conical shape having a cone angle at the apex of about 10° to 16°.

* * * * *